United States Patent [19]

Supernaw et al.

[11] Patent Number: 5,065,016

[45] Date of Patent: Nov. 12, 1991

[54] RADIOACTIVE WELL LOGGING TO DETERMINE VERTICAL BRINE FLOW

[75] Inventors: Irwin R. Supernaw; Thomas M. Williams, both of Houston, Tex.

[73] Assignee: Texaco Inc., White Plains, N.Y.

[21] Appl. No.: 535,700

[22] Filed: Jun. 11, 1990

[51] Int. Cl.$^5$ .............................................. G01V 5/12
[52] U.S. Cl. ................................... 250/264; 250/266; 250/356.2
[58] Field of Search ............. 250/264, 265, 266, 356.2

[56] References Cited

U.S. PATENT DOCUMENTS

| | | | |
|---|---|---|---|
| 3,514,598 | 5/1970 | Youmans | 250/264 |
| 3,603,795 | 9/1971 | Allaud | 250/264 |
| 4,051,368 | 9/1977 | Arnold et al. | 250/270 |
| 4,169,979 | 10/1979 | Arnold et al. | 250/266 |
| 4,380,701 | 4/1983 | Smith, Jr. et al. | 250/266 |
| 4,486,658 | 12/1984 | Scott et al. | 250/270 |

Primary Examiner—Carolyn E. Fields
Attorney, Agent, or Firm—Jack H. Park; Kenneth R. Priem; Ronald G. Gillespie

[57] ABSTRACT

Brines in earth formations in the vicinity of a well borehole are bombarded with neutrons. The neutrons are slowed to thermal energy and captured by sodium atoms in the brine according to the nuclear reaction $^{23}$Na (n, $\gamma$) $^{24}$Na. Spaced arrays of gamma ray detectors in a sonde in the borehole obtain gamma ray measurements following activation to obtain measurements of horizontal brine flow past the borehole. The detector arrays are vertically spaced from each other along the axis of the sonde. Changes in the count ratios of the detector arrays indicates a vertical flow of the brine.

11 Claims, 2 Drawing Sheets

RADIOACTIVE WELL LOGGING TO DETERMINE VERTICAL BRINE FLOW

BACKGROUND OF INVENTION

1. Field of Invention

The present invention relates to radioactive well logging.

2. Description of Prior Art

U.S. Pat. Nos. 4,051,368; 4,169,979 and 4,486,658, all assigned to the assignee of the present application, involve determining horizontal brine flow speed of brines in a formation past a well borehole. In these patents formation brine is bombarded with neutrons from a neutron source in a sonde lowered by wire line into a well borehole. The neutrons are slowed to thermal energy level. When the brine is saline, the nuclear reaction $^{23}Na$ (n, $\gamma$) $^{24}Na$ occurs. One or more gamma ray detectors in the sonde measures gamma radiation from this nuclear reaction. The gamma radiation measurements are then processed to determine horizontal brine flow.

U.S. Pat. No. 4,051,368 related to determining the location and horizontal flow rate of earth formation brines past a well borehole. U.S. Pat. No. 4,169,979 related to measuring the azimuth and speed of horizontal brine flow by a well borehole. U.S. Pat. No. 4,486,658 related to displacing borehole brine away from the sonde, and thus the detectors, to remove any contribution of borehole salt water to the gamma ray measurements.

SUMMARY OF THE INVENTION

Briefly, with the present invention, it has been found that if there is also a vertical flow component of the activated brine, the horizontal flows calculated may be in error. Accordingly, the sonde is provided with at least two vertically spaced detectors or detector groups. The count ratio of gamma rays detected in the spaced detector groups is then monitored. If the count ratio changes, irradiated brine is moving towards one detector group and away from the other, indicating vertical brine flow. The vertically spaced detector groups also are used to determine the relative position of the irradiated zone to the center of the sonde detector system and also to locate the center of the sonde in the center of the irradiated zone. If the vertically flowing brine is formation brine, the horizontal flow measurement accuracy is affected. If the vertically flowing brine is borehole brine, background radiation measurements are changed, interfering with data interpretation.

DESCRIPTION OF THE PREFERRED EMBODIMENT

Figure 1:
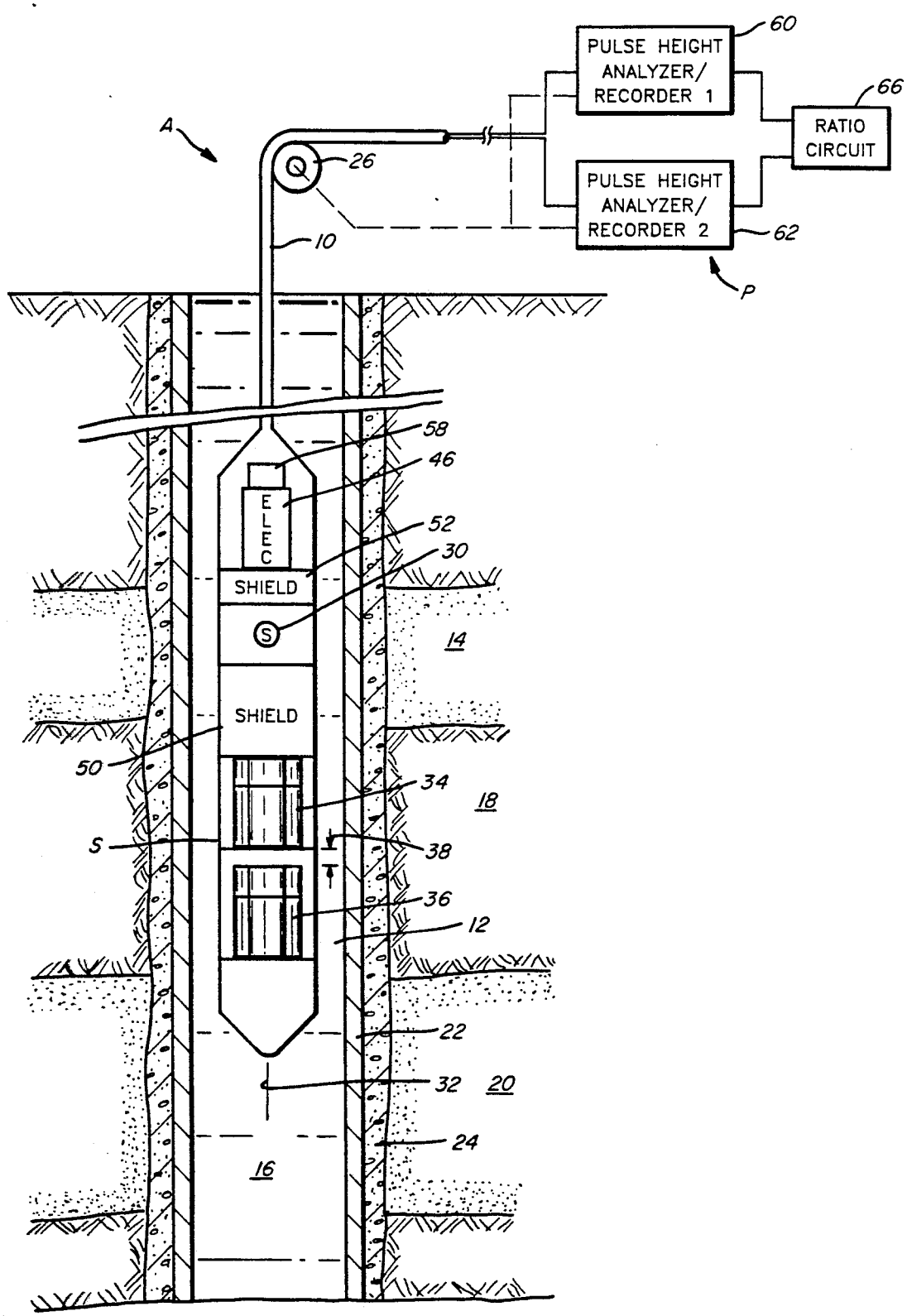
FIG. 1 is a schematic illustration showing a well logging sonde in a well borehole adjacent a formation for brine flow detection according to the present invention.

In the drawings, the letter A designates generally a well logging apparatus according to the present invention. The well logging apparatus A includes an elongated downhole sonde S and a surface electronic/processing unit P. The sonde S is suspended and moved by an armored well logging cable 10 in a well borehole 12 to a selected depth adjacent a formation 14 of interest. The well borehole 12 is typically filled with a brine 16 which may come from the formation 14 or one or more other formations 18 and 20. In some situations, the well borehole 12 may be lined with a casing 22 held in place by cement 24. The well logging cable 10 passes over a sheave wheel 26 coupled electrically or mechanically to the surface electronic processing unit P so the depth that which well logging measurements are made in the borehole 12 are known and recorded.

In the sonde S, a neutron source 30 is provided to bombard or irradiate the formation 14 of interest with neutrons. The source 30 is typically a continuous neutron source, such as an Actinium-Beryllium source, an Americium-Beryllium source or a Californium$^{252}$ source. The neutrons from source 30 bombard the borehole brine 16 and formation 14 and any brine in it and are slowed to thermal energy. When there is at least partial salinity in the borehole 16 or the formation 14, the thermal energy neutrons are captured by sodium atoms, giving rise to the nuclear reaction $^{23}Na$ (n, $\gamma$) $^{24}Na$. The radioactive isotope $^{24}Na$ then decays by emission of gamma radiation at an energy level of 2.75 MeV. However, if flow rates are sufficiently high, it may be desirable instead to replace the continuous neutron source 30 with a deuterium-tritium accelerated neutron source and cause the $^{16}O$ (n, p) $^{16}N$ nuclear reaction using the decay of the isotope $^{16}N$ as the radiation tracer.

Figure 3:
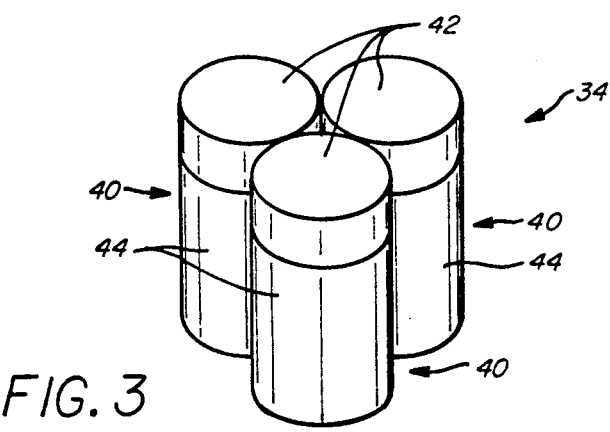
FIG. 3 is a schematic isometric view of one of the gamma ray detector clusters in the well logging sonde of FIG. 1.

Located in the sonde at a spaced position along a vertical longitudinal axis 32 from a source 30 are a first gamma ray detector assembly 34 and a second gamma ray detector assembly 36. Gamma ray detector assemblies 34 and 36 are also spaced from each other a predetermined distance 38 which need only be on the order of one inch or so. At least one of the gamma ray detector assemblies 34 and 36 is formed from a cluster of three gamma ray detectors 40 (FIG. 3) displaced equidistant from the neutron source 30 longitudinally in the sonde S and disposed symmetrically along the vertical longitudinal axis 32 of the sonde S. In some situations, both gamma ray detector assemblies 34 and 36 may be formed of clusters of three such gamma ray detectors 40 configured in the manner shown in FIG. 3. In other situations, only one of the gamma ray detector assemblies 34 and 36 need be a cluster of three gamma ray detectors 40, the other such detector assembly being a single gamma ray detector 40 centered along the vertical longitudinal axis 32 of the sonde S and spaced from the other gamma ray detector assembly by the distance 38. The gamma ray detectors 40 in each of the assemblies 34 and 36 are, for example, sodium iodide, thallium-activated scintillation crystals 42, each optically coupled to an associated photo-multiplier tube 44.

As is known in the art, gamma rays entering a scintillation crystal interact with the crystal to produce light flashes, or scintillations, whose intensity is functionally related to the gamma ray energy of the entering radiation. The light flashes are then detected by the photo-multiplier tube 44 to generate voltage pulses proportional in magnitude or height to the intensity of the corresponding light flashes. A succession of pulses is thereby produced in the detector 40 with the height of the pulses being proportional to the energy of the incoming gamma ray. The pulse streams from each detector 40 in the detector assemblies 34 and 36 are then conducted to signal processing equipment located in an electronic package 46 located toward an upper end of the sonde S. A set of pulse streams from each gamma ray detector 40 in the gamma ray detector assemblies 34 and 36 can then be multiplexed or encoded by conventional well logging transmission schemes and transmitted via the well logging cable 10 to the electronic/processing unit P.

It should be understood that appropriate power supplies are provided at the surface and connected to the electronics package 46 by suitable conductors within the well logging cable 10 to provide operating power for the electronics package 46 and the gamma ray detector assemblies 34 and 36. Alternatively, power supplies may be included within the sonde S for the electronics 46 and the gamma ray detector assemblies 34 and 36. Since these power supplies are conventional, they are not shown in detail in the drawings. The pulse streams from the gamma ray detector assemblies 34 and 36 may, if desired, pass to a downhole comparator appropriately biased to reject all voltage pulses of height corresponding to incident gamma rays of energy levels less than 2.65 MeV or other suitable energy level before being sent via the logging cable 10 to the surface electronics/processing unit P.

Between the neutron source 30 and the gamma ray detector assemblies 34 and 36 in the sonde S is shielding material 50 of a suitable type to prevent direct irradiation of the scintillation crystal 42 by neutrons from the neutron source 30. Suitable shielding materials are those with a high hydrogen content, such as paraffin or other polymolecular hydrocarbon structure. The high hydrogen content serves to slow down or rapidly attenuate neutron population from the neutron source 30, preventing such a thermalized neutron population from reaching the scintillation crystal 42. Strong thermal neutron absorbers such as cadmium may also be interposed within the hydrogenate shielding material, if desired. Further, additional shielding 52 is located between the source 30 and the electronics package 46 to protect same.

When it is desired to measure the azimuth of flow by the borehole 12, a gyrocompass 58 of the type disclosed in U.S. Pat. No. 4,169,979 is included in the sonde S. The teachings of this prior art patent in this regard are incorporated herein by reference.

Figure 2:
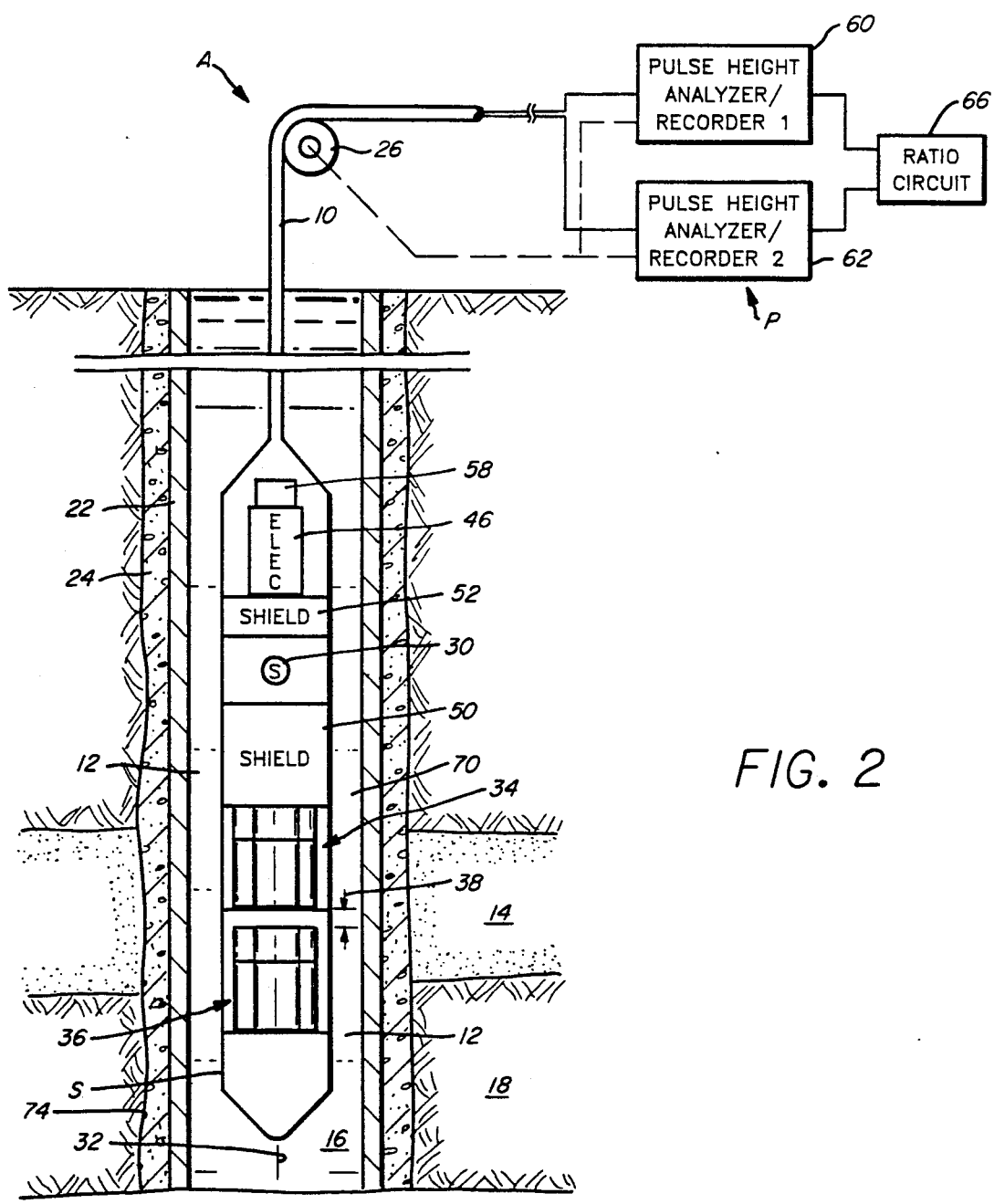
FIG. 2 is a schematic illustration showing the well logging sonde of FIG. 1 moved to a different position in the well borehole.

As has been set forth above, if the brine in formation 14 or the borehole 16 is at least partially saline, the neutrons bombarding from source 30 after being slowed to thermal energy are captured by $^{23}$Na, giving rise to the nuclear reaction $^{23}$Na (n, $\gamma$) $^{24}$Na. After the formation 14 is bombarded with neutrons, the sonde S is raised by wire line 10 to a position (FIG. 2) where the gamma ray detectors 34 and 36 are adjacent the formation 14. The radioactive isotope $^{24}$Na decays by emission of gamma radiation at an energy level of 2.75 MeV which can be detected by the gamma ray detector assemblies 34 and 36 to form a record of the presence and intensity of such gamma radiation.

With the present invention, it has been found that if there is any vertical flow of the neutron bombarded borehole brine 16 or brine in the formation 14, measures of horizontal brine flow past the borehole 12 may be erroneously affected. Accordingly, the first and second gamma ray detector groups 34 and 36 vertically spaced from each other by the distance 38 are used to detect any such vertical brine flow. Any such vertical brine flow past the gamma ray detector assemblies 34 and 36 by its nature flows away from one detector group while flowing toward the other.

The gamma ray detector groups 34 and 36 are separately coupled to associated pulse height analyzer/recorder apparatus 60 and 62, respectively, in the surface electronics/processing unit P. The gamma rays detected by the first gamma ray detector assembly 34 are received, stored, analyzed and recorded in analyzer/recorder unit 60 while the gamma rays detected in gamma ray detector assembly 36 are received, stored, analyzed and recorded in analyzer/recorder unit 62. If desired, a single analyzer/recorder unit may be used, with the different gamma ray detector counts being received and stored in different storage areas in a single memory.

The analyzer/recorder units 60 and 62 provide output signals indicative of the gamma radiation counted to a ratio circuit 66 which forms an indication of the ratio of the gamma rays detected in the respective gamma radiation detector assemblies 34 and 36. If the ratio of the gamma radiation detected by the two detector assemblies differs from unity, the ratio circuit will so indicate, forming a measure of the relative vertical brine flow in the borehole 12. The well logging apparatus A can also be used to determine whether the sonde S is centered in the radiated zone 14 of interest by monitoring the output of the ratio circuit 66 as the sonde S is moved with respect to the radiated zone 14. When the output of the ratio circuit 66 becomes unity, the sonde S is centered in the irradiated zone 14 of interest.

If irradiated brine is flowing in the borehole 12 from a point 70 (FIG. 2) down past the gamma ray detector assemblies 34 and 36, the gamma radiation count rate in detector 34 increases before the counting rate in detector 36 increases. The converse is true if the brine flow is in the reverse direction. Further, if formation brine flows down outside the casing 22 in a channel 74, the count rate in gamma ray detector assembly 36 becomes higher than the count rate in gamma ray detector assembly 34.

The output count of ratio circuit 66 can also be used to determine the relative position of irradiated zone 14 with respect to the longitudinal center of the spaced gamma ray assemblies 34 and 36. In addition, according to the present invention, vertical brine flow in the formation which might affect the accuracy of calculated horizontal brine velocity flow measurements can be detected. Also, any vertical flow of activated borehole brine 16, which could result in a fluctuating background radiation level which might otherwise interfere with the quality of data interpretation, can be detected.

Having described the invention above, various modifications of the techniques, procedures, material and equipment will be apparent to those in the art. It is intended that all such variations within the scope and spirit of the appended claims be embraced thereby.

We claim:

1. A method of well logging to determine the presence of vertical flow of brine about a well borehole, comprising the steps of:

irradiating the brine at a selected depth in the well borehole with neutrons from a neutron source in a sonde in the well borehole;

moving the sonde so that a pair of vertically spaced gamma ray detectors in the sonde are at the selected depth;

detecting gamma rays with each of the pair of vertically spaced gamma ray detectors;

forming a measure of gamma rays counted by a first of the pair of vertically spaced gamma ray detectors;

forming a measure of gamma rays counted by a second of the pair of vertically spaced gamma ray detectors;

forming a ratio of the measure of gamma rays counted by the first and second of the pair of vertically spaced gamma ray detectors; and forming a measure of relative vertical brine flow from the ratio of the measure of gamma rays mounted.

2. The method of claim 1, wherein:

said step of forming a measure of the gamma rays counted by a first of the pair of vertically spaced gamma ray detectors includes limiting the gamma rays counted to those within a selected energy range.

3. The method of claim 2, wherein:

said step of forming a measure of the gamma ray counted by a second of the pair of vertically spaced gamma ray detectors includes limiting the gamma rays counted to those within a selected energy range.

4. The method of claim 1, further including the step of:

moving the sonde in the well borehole to a position where the pair of vertically spaced gamma ray detectors are centered on the selected depth of irradiation.

5. The method of claim 1, wherein the brine is formation brine.

6. The method of claim 1, wherein the brine is borehole brine.

7. The method of claim 1, further including the step of:

monitoring the ratio of gamma rays counted to detect changes in such ratio.

8. The method of claim 1, further including the step of:

monitoring the ratio of gamma rays counted to detect changes in such ratio indicative of changes in vertical brine flow.

9. The method of claim 8, wherein the brine is formation brine.

10. The method of claim 8, wherein the brine is borehole brine.

11. A method of well logging to locate the center of a formation of interest having vertical flow of brine about a well borehole, comprising the steps of:

irradiating the brine at a selected depth in the well borehole with neutrons from a neutron source in a sonde in the well borehole;

detecting gamma rays with each of a pair of vertically spaced gamma ray detectors in the sonde;

forming a measure of gamma rays counted by a first of the pair of vertically spaced gamma ray detectors;

forming a measure of gamma rays counted by a second of the pair of vertically spaced gamma ray detectors;

forming a ratio of the measure of gamma rays counted by the first and second of the pair of vertically spaced gamma ray detectors; and moving the sonde in the well borehole to a depth where the ratio of the measure of gamma rays counted is unity to locate the center of the formation of interest.

* * * * *